(12) United States Patent
Farouki et al.

(10) Patent No.: US 7,389,501 B1
(45) Date of Patent: Jun. 17, 2008

(54) SYSTEM AND METHOD FOR REGISTER ALLOCATION USING SSA CONSTRUCTION

(75) Inventors: Karim T. Farouki, Seattle, WA (US); James J. Radigan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 10/368,746

(22) Filed: Feb. 18, 2003

(51) Int. Cl.
*G06F 9/44* (2006.01)

(52) U.S. Cl. ........................ 717/152; 717/154; 717/158; 717/159

(58) Field of Classification Search ................. 717/152, 717/154, 158, 159, 161
See application file for complete search history.

(56) References Cited

U.S. PATENT DOCUMENTS

| | | | |
|---|---|---|---|
| 5,659,754 A * | 8/1997 | Grove et al. ................. | 717/158 |
| 6,072,952 A * | 6/2000 | Janakiraman ................ | 717/155 |
| 6,226,789 B1 * | 5/2001 | Tye et al. ..................... | 717/138 |
| 6,260,190 B1 * | 7/2001 | Ju ................................ | 717/156 |
| 6,286,135 B1 * | 9/2001 | Santhanam ................. | 717/146 |
| 6,301,704 B1 * | 10/2001 | Chow et al. ................. | 717/146 |
| 6,463,582 B1 * | 10/2002 | Lethin et al. ................ | 717/158 |
| 2004/0128660 A1 * | 7/2004 | Nair et al. .................... | 717/156 |

OTHER PUBLICATIONS

Araujo, G. et al., "Global Array Reference Allocation", *ACM Transactions on Design Automation of Electronic Systems*, 2002, 7(2), 336-357.

Cytron, . et al., "An Efficient Method of Computing Static Single Assignment Form", *ACM*, 1989, 25-35.

Faustmann, G., "Configuration for Adaptation- A Human-Centered Approach to Flexible Workflow Enactment", *Computer Supported Cooperative Work*, 2000, 9, 413-434.

(Continued)

*Primary Examiner*—Tuan Dam
*Assistant Examiner*—Andrew Y. Chou
(74) *Attorney, Agent, or Firm*—Woodcock Washburn LLP

(57) ABSTRACT

The construction of Static Single Assignment form (SSA) is used as a dynamic conflict graph so that while constructing SSA in linear time, the program being analyzed is simultaneously register allocated. When allocating a register for the symbol, the conflict set is examined so that the register chosen for the symbol is not used by a symbol in the conflict set. When a symbol is register-allocated, the symbol is added to all the conflict set of all live symbols. A live symbol is determined by keeping two counters, called herein a use counter and a use threshold counter. Both counters are initialized when a definition of a symbol is encountered in a block. Both counters are incremented when a use of the symbol is encountered when traversing a block in a depth-first downward traversal. The use count is decremented when a use is detected when traversing the block in an upward traversal. A symbol is live when the use count is less than the use count threshold and the use count is greater than zero when a register is allocated. The register-allocated symbol is added to the conflict set of all live symbols.

11 Claims, 14 Drawing Sheets

OTHER PUBLICATIONS

Kammer, P.J. et al., "Techniques for Supporting Dynamic and Adaptive Workflow", *Computer Supported Cooperative Work*, 2000, 9, 269-292.

Lee, I.B. et al., "KWM: Knowledge-based workflow Model for Agile Organization", *Journal of Intelligent Information Systems*, 1999, 13, 261-278.

Musich, P. "MSPs Make Big Deals-As Customer's Names Change, Small Companies License Software, Team with Larger Vendors", *News and Analysis, Eweek*, 2002, 23, 2 pages.

Schulz, N., "Library Collections, Acquisitions, & Technical Services", *E Journal Database*, 2001, 25(4), 449-459 (Cover Page).

Vegdahl, S.R., "Using Node Merging to Enhance Graph Coloring", *ACM*, 1999, 34(5), 150-154.

\* cited by examiner

SYSTEM AND METHOD FOR REGISTER ALLOCATION USING SSA CONSTRUCTION

FIELD OF THE INVENTION

This invention relates to the field of computing and in particular to the field of allocating registers in a compiler.

BACKGROUND OF THE INVENTION

Register allocation is a classic problem in computer science. The assignment of registers to variables is difficult and typically takes a long time because there are a limited number of (very fast access) registers. Variables can be stored in (much slower) memory instead of in registers, but doing so typically adversely affects run-time performance of the program. Hence optimal register allocation is considered a very difficult computer science problem and can take a very long time.

For example, assume that a computer has two registers and a user writes a program using three variables, a, b, and c. Suppose the lifetimes of variables a and c do not overlap, that is, the lifetime for a has no instructions in common with the lifetime for c. Suppose that the lifetime of b overlaps the lifetimes of both a and c. It is clear that b cannot be assigned the same register assigned to either a or c but that a and c can be assigned the same register because a and c do not conflict.

Hence, it is clear that the concept of the lifetime of variables are important when allocating registers in an efficient way. Registers can be allocated to variable lifetimes by: (1) building a conflict graph which identifies which variables cannot be assigned to the same register simultaneously; (2) assigning registers to variables until the registers are used up; (3) splitting the lifetime of some of the variables by "spilling" the contents of the registers into main memory so that registers can continue to be assigned to variables; and (4) returning to step (2). The process of assigning registers to variables is called register coloring.

Another problem encountered in an optimizing compiler is acquiring information about the structure and nature of the program. This problem has been addressed by associating every use of a variable in a program with a single unique definition for the variable by constructing a Static Single Assignment (SSA) form of the program. When a program has been put in SSA form, each use of a variable in the program will have a pointer associated with it that points to the single unique definition of the variable. These pointers are typically "use-def links" or "use-def edges."

For example, given the following simple program, Program 1:

x=
y=
z=x+y
z=z+x the SSA form might be represented as illustrated in FIG. 1.

When more than one definition for a given variable exists, phi functions are inserted. For example, suppose the following simple program, Program 2 exists:

If (some conditional C)
{
then x=
}
else
{
x=
}
=x
endif

This program can be represented in flowgraph form, Flowgraph 1, as shown in FIG. 2.

In Flowgraph 1, block 1 represents whatever code preceded the If statement. As a result of the If statement, control will branch to either block 2 or block 3. In block 2 there is a definition of x (x=?) and in block 3 there is a definition of x (x=?). As the program is written, then, we cannot draw in an edge from the use of X in block 4 (=x) to its "single unique definition". To overcome this problem, a phi function: $x_3 = \sigma(x,x)$ is inserted in block 4. X (in block 2) is renamed $x_1$ and x (in block 3) is renamed $x_2$. In this way every x has associated with it just one definition. It will be seen that there are as many inputs to a phi function as there are control flow edges that allow entrance into a block. In this case because there are two pathways to enter block 4 (via block 2 or via block 3), so there are two inputs to the phi function. The end result (Flowgraph 2) showing the control flow edges as well as the use-def edges is shown in FIG. 3.

A dominance frontier is a property of a block in a flowgraph. For example, consider the following simple program, represented in flowgraph form in Flowgraph 3 shown in FIG. 4.

A block (e.g., block 1) is said to dominate another block (e.g., block 2) if and only if all possible paths from the entry block (e.g., block 0) to block 2 include block 1. Here you used to have the "preceding block" which was correct in this case but only because of the coincidence that the predecessor block was the entry block. In Flowgraph 3, block 1 dominates blocks 2, 3 and 4. By definition, a block also dominates itself. A block (e.g., block 1) is said to strictly dominate another block (e.g., block 2) if and only if block 1 dominates block 2 and block 1 is not block 2. Predecessors of a block are all the blocks that have edges going to it. For example, in the above diagram, block 4's predecessors are blocks 2 and 3, and block 1's predecessor is block 0 and so on. A dominance frontier of a block B (denoted df(B)) is the set of all blocks (b) such that B dominates a predecessor of b, and B does not strictly dominate b., or:

df (B)={b:B dom pred (b) & B does not strictly dom b}.

In Flowgraph 3, block 4 is a member of the dominance frontier of block 3. In this case B=block 3 and b=block 4. Block 3 is a predecessor of block 4 and block 3 dominates itself (by definition) so block 3 dominates a predecessor of 4. Block 3 does not strictly dominate block 4 because block 4 can be reached by going through block 2 (thereby circumventing block 3) therefore block 4 is a member of the dominance frontier of 3.

Dominance frontiers are useful to indicate where phi functions should be inserted. For example, if there were a definition (e.g., x=) in a block (e.g., block 3) in Flowgraph 3, a phi function (e.g., $x=\sigma(x,x)$) should be placed in the blocks associated with the dominance frontier of block 3 (e.g., a phi function $x=\sigma(x,x)$ should be placed in block 4). Flowgraph 4, shown in FIG. 5, illustrates Flowgraph 3 with the addition of definitions of x and the inserted phi function.

To construct the SSA form, first the dominance frontier is constructed for all the blocks (referred to as generating an iterated dominance frontier). Then by inspection from the location of all the definitions, the phi functions are placed. Finally, the control flowgraph edges are added. To accomplish this, the flowgraph is traversed in a depth-first order, as illustrated in FIG. 6.

To traverse Flowgraph 5 in depth-first order, first block 0 is traversed, and then block 0's descendant, block 1, is traversed. Block 1 has two descendants, block 2 and block 5. One of the descendants is randomly selected (e.g., block 2), one of block 2's descendants is randomly selected (e.g., block 3), one of block 3's descendants is randomly selected (e.g., block 4). At this point there are no more descendants so traversal continues at the predecessor block (e.g., block 3), but there are no more unvisited descendants. Traversal continues at block 3's predecessor, so block 2 is traversed, but there are no more unvisited descendants. Traversal continues at block 2's predecessor (e.g., block 1). Block 1 had another predecessor (e.g. block 5) which has not been traversed yet. Block 5 is traversed. Block 5 has no unvisited descendants so the traversal continues to block 1. Block 1 has no unvisited descendants, so traversal continues to block 0. During this traversal, whenever a definition of a variable is encountered, the variable is pushed onto a renaming stack associated with that variable. When block 1 is traversed, a definition is found (labeled $x_1$) and is placed onto a renaming stack (currently empty). Block 2 has no definitions, but has a use (=x). By definition, the use is the current top of the stack so an edge is added (e.g., edge a). Block 3 contains another definition of x (a phi function, labeled $x_2$). Because block 3 contains a phi function, and only one definition of x ($x_1$) has been encountered so far, the first phi function parameter is wired up to the x in block 1 (edge b). The phi function is labeled $x_2$ and is placed onto the renaming stack. Block 4 contains neither a definition nor a use. Traversal proceeds upwards to block 1 and then down to block 5. In block 5 a new definition is encountered (e.g., $X_3$), which is pushed on the stack. Also in block 5 a use (=x) is found and is wired up (edge c) to the definition of x on the top of the stack ($x_3$). Upon returning to block 3, the second x in the phi function is wired up to $x_3$ (edge d).

Hence, SSA construction is typically broken down into the following sequence of steps: first an Iterated Dominance Frontier (IDF) is constructed; then the IDF is used to inject phi-functions where necessary into the instruction stream; and finally, the variables in the program are renamed with an array of renaming stacks while a pre-order depth-first recursive walk of the flow graph is performed. Because each block is processed once, the amount of work performed is a function of the number of blocks, so that SSA construction takes place in linear time.

In traditional compilers, the time expended to transform user code into machine code is not critical. Typically, it is more important to emit the best possible resultant code (e.g., making the resultant code run 10% faster) than to emit the code as fast as possible. In the world of just-in-time (JIT) compilers, in the JAVA run-time world, in IBM's run-time world, in the .NET run-time world and so on, however, compilation occurs while a user is running an application or program, hence trade-offs have to be made between the amount of time spent performing analysis and optimization and the expected improvement in run-time performance of the transformation. It would be helpful if multiple phases of compilation, such as register allocation and SSA construction, could be combined into a single phase without adding complexity so that optimally, more could be accomplished in less time, thus enabling both an increase in analysis/optimization throughput and run-time performance.

SUMMARY OF THE INVENTION

The construction of Static Single Assignment form (SSA) is used as a dynamic conflict graph so that while constructing SSA in linear time, the program being analyzed is simultaneously register allocated. When a symbol is spilled to memory, context about the local code is available, enabling the development of heuristics that take into account nesting of loops and other important pieces of information yielding better resultant code. A conflict set for a symbol (e.g., a variable) is created during the Static Single Assignment form construction of a program. When allocating a register for the symbol, the conflict set is examined so that the register chosen for the symbol is not used by a symbol in the conflict set. When a symbol is register-allocated, the symbol is added to all the conflict set of all live symbols. A live symbol is determined by keeping two counters, called herein a use counter and a use threshold counter. Both counters are initialized when a definition of a symbol is encountered in a block. Both counters are incremented when a use of the symbol is encountered when traversing a block in a depth-first downward traversal. The use count is decremented when a use is detected when traversing the block in an upward traversal. When the process traverses back up the flow graph, and then starts going down again along a different path the UseCountThreshold is reset to the current value of the UseCount. Consequently, while descending it is a static property that the UseCount == UseCountThreshold. In addition, dummy uses may be injected when popping a block with unvisited predecessors and in loops. A symbol is live when the use count is less than the use count threshold and the use count is greater than zero when a register is allocated. The register-allocated symbol is added to the conflict set of all live symbols.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The construction of a modified Static Single Assignment form (SSA) of a program is used as a dynamic conflict graph so that while constructing modified SSA in linear time, the variables (symbols) in the program being analyzed are simultaneously register allocated. When a symbol is spilled to memory, context about the local code is available, enabling the development of heuristics that take into account nesting of loops and other important pieces of information yielding better resultant code.

During the renaming phase of the modified SSA construction, information equivalent to the conflict graph needed for register allocation may be available. Therefore, at any point in time, by examining the top of the renaming stack to determine what variables are live, enables the combination of modified SSA construction and register allocation into a single linear phase. Two new fields (use count and use count threshold) are added to the structure pushed onto the renaming stacks. Use count is the actual count of the number of uses of a variable that exists in the blocks that have been pushed during the depth first traversal of the renaming phase but have not yet been popped. Use count threshold is the total number of uses encountered while diving along a particular arc of the flowgraph during the depth first traversal, without decrementing that value when popped. By comparing use count and use count threshold at any point in time when popping back up from the depth first traversal of the flowgraph, it can be determined whether or not a symbol associated with the renaming stack is live.

Exemplary Computing Environment

Figure 1:
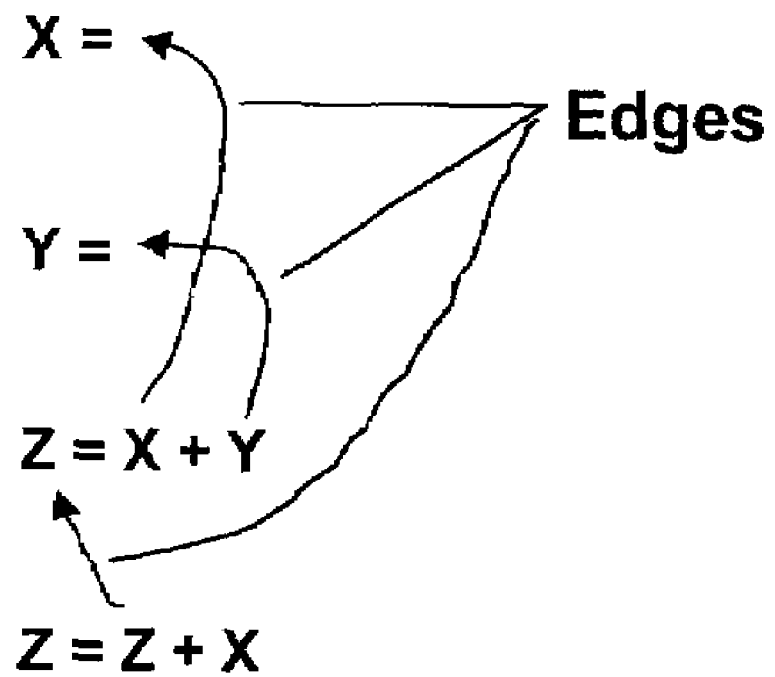
FIGS. 1-6 illustrate the process of traversing a Static Single Assignment form of an exemplary program.
Figure 2:
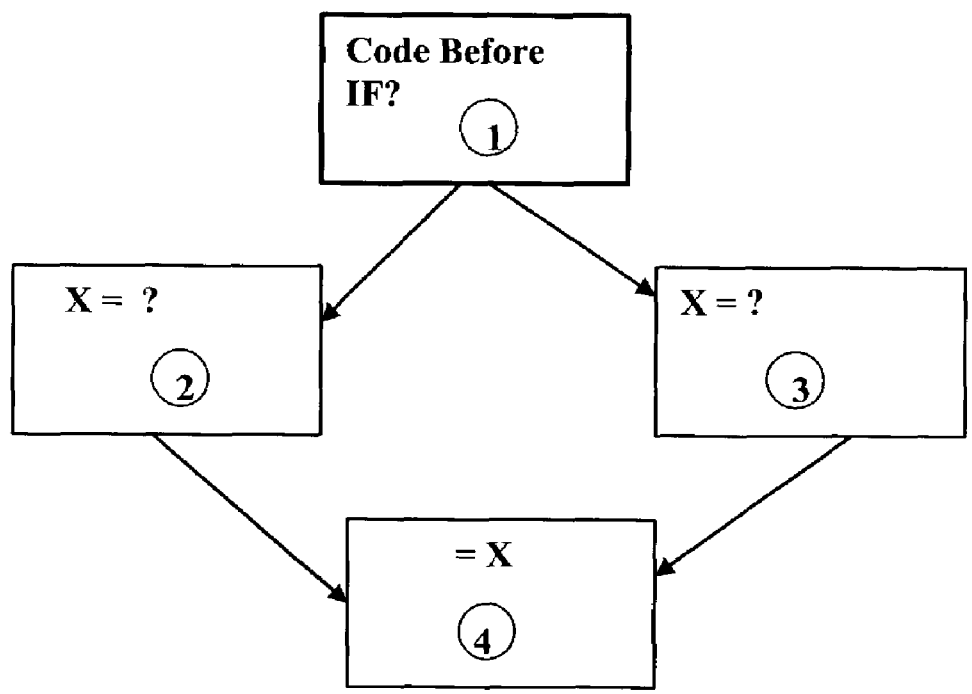
Figure 3:
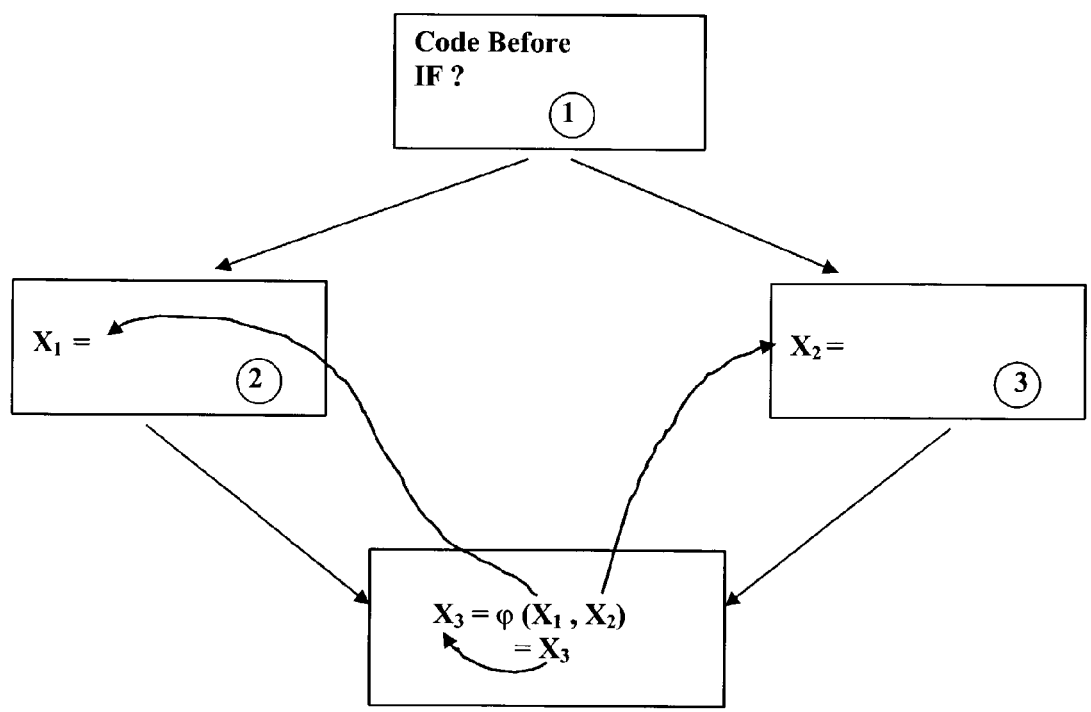
Figure 4:
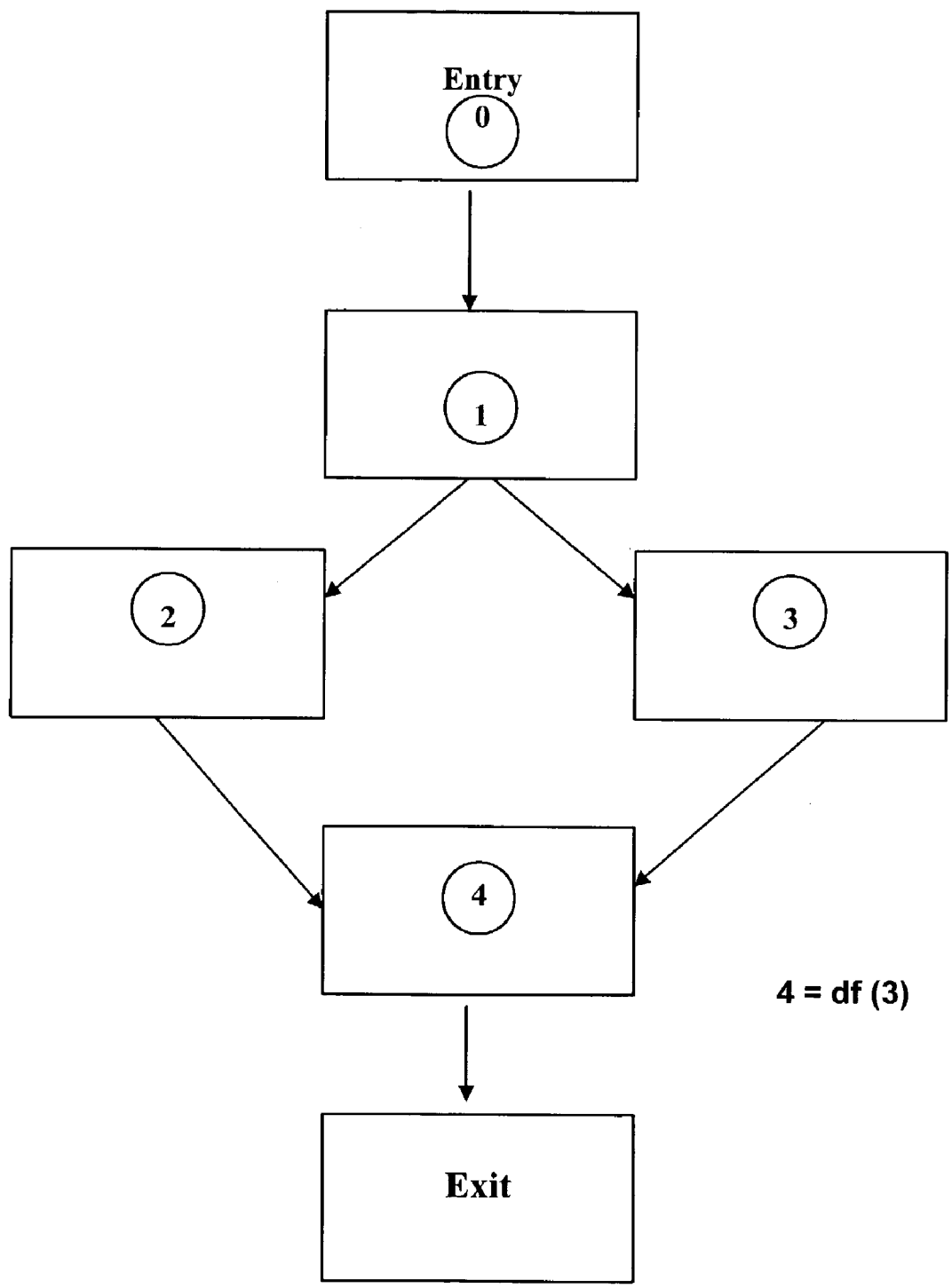
Figure 5:
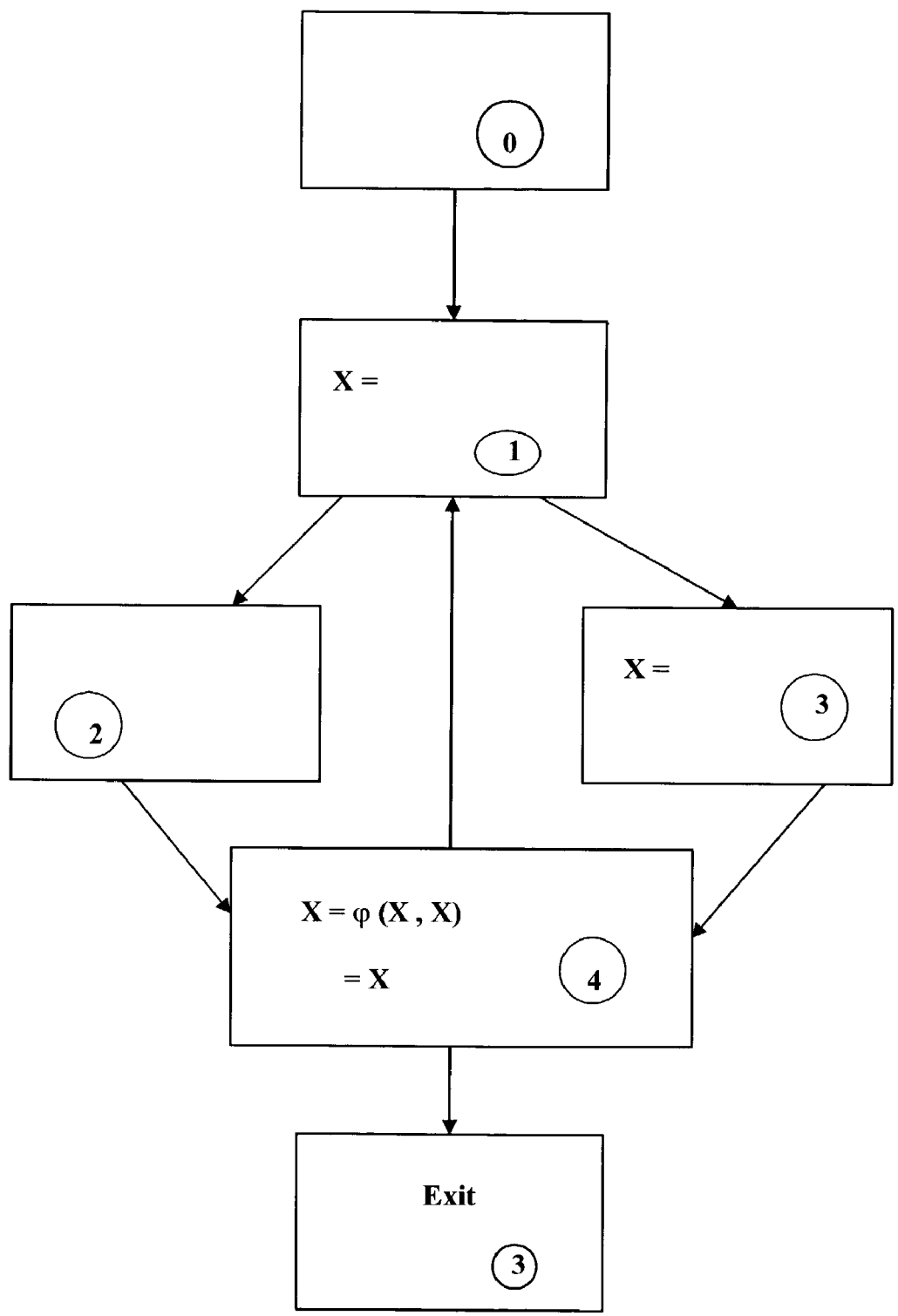
Figure 6:
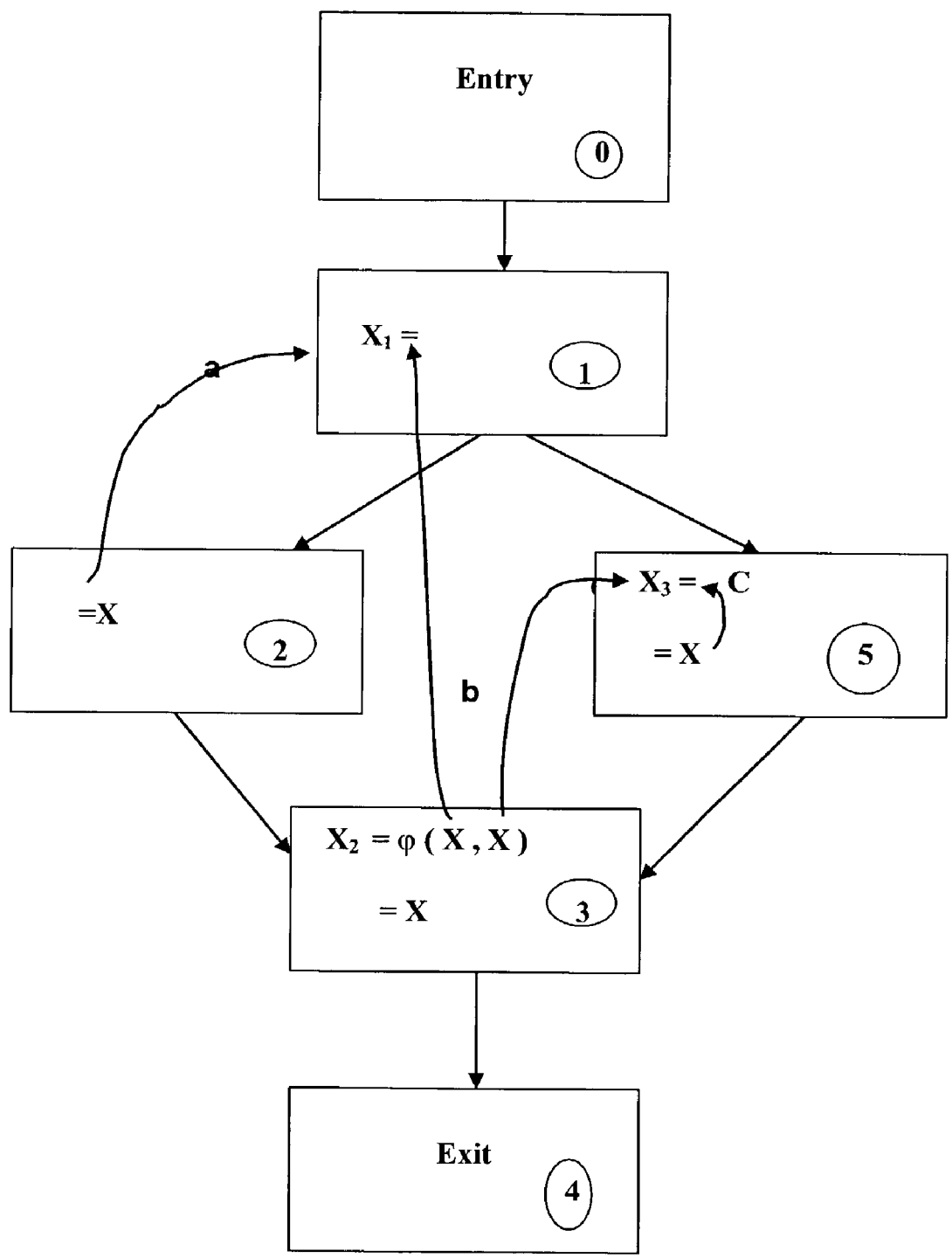
Figure 7:
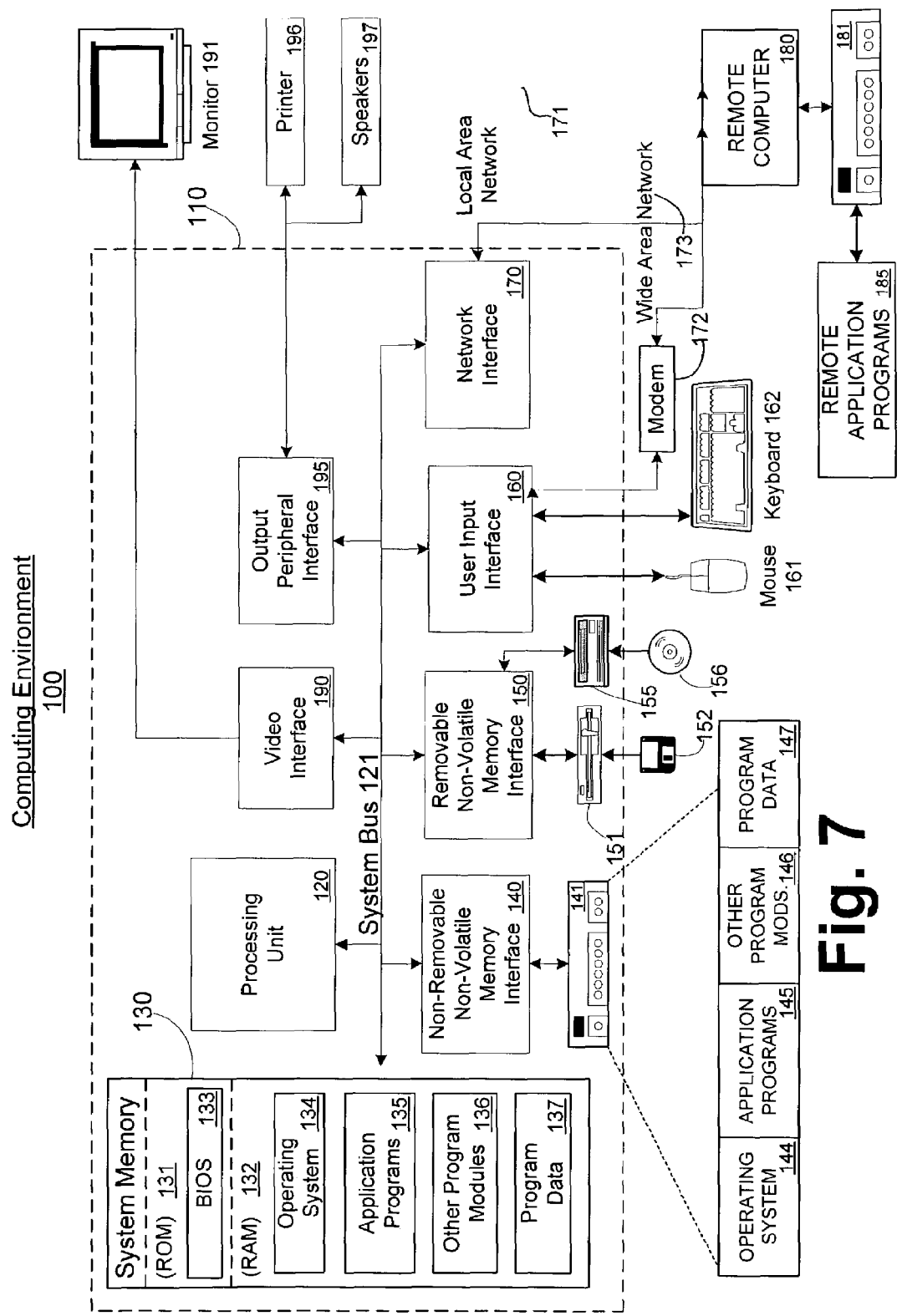
FIG. 7 is an exemplary computing environment in which aspects of the present invention may be implemented.

FIG. 7 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 7 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7 provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Allocating Registers using a Modified SSA Technique

Figure 8:
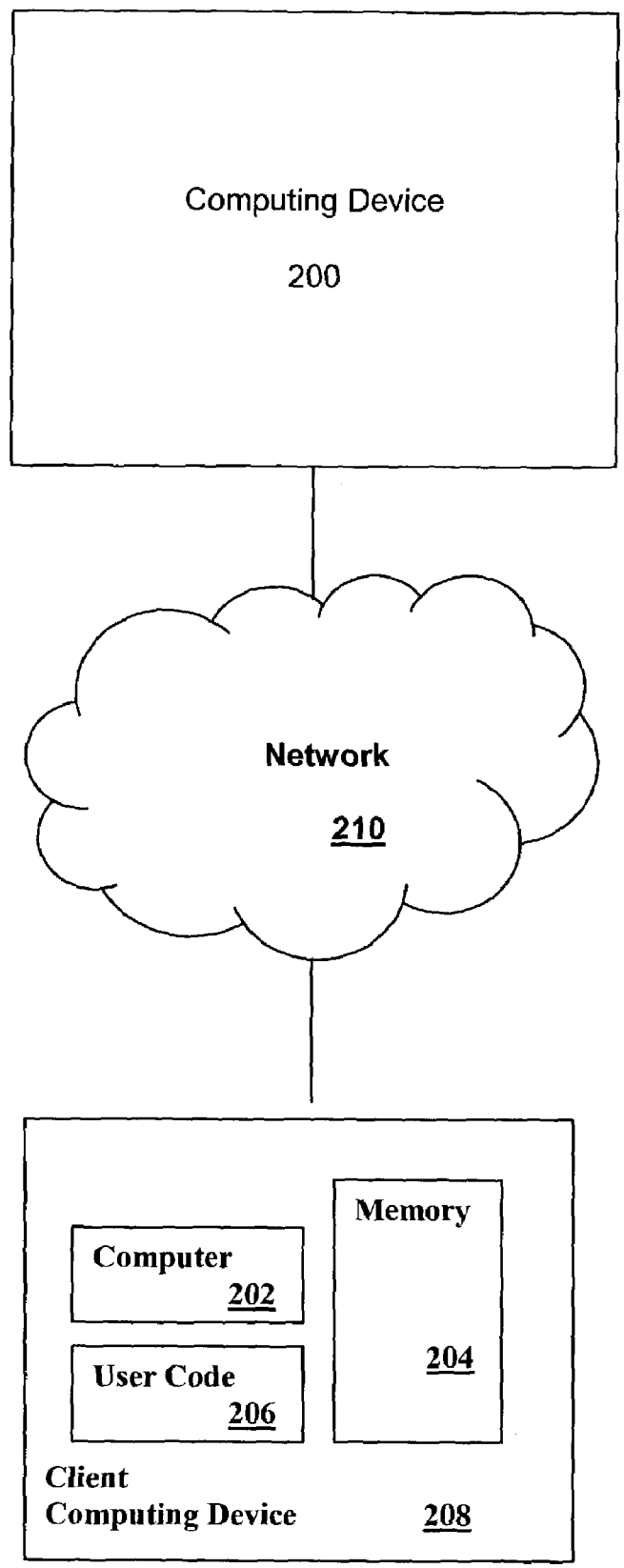
FIG. 8 is a block diagram illustrating a system for register allocation in accordance with one embodiment of the present invention.

Referring now to FIG. 8, there is illustrated user code 206 on a client 208 that may be connected via a network 210 such as the Internet, an intranet or other suitable network to a computing device 200 such as but not limited to a server. User code may be transformed by compiler 202 using memory 204 to generate executable code (not shown). In one embodiment of the invention, the executable code is generated in real-time. It will be understood that FIG. 8 is exemplary only. For instance, compiler 202 and memory 204 may reside on computing device 200 and so on.

Figure 9A:
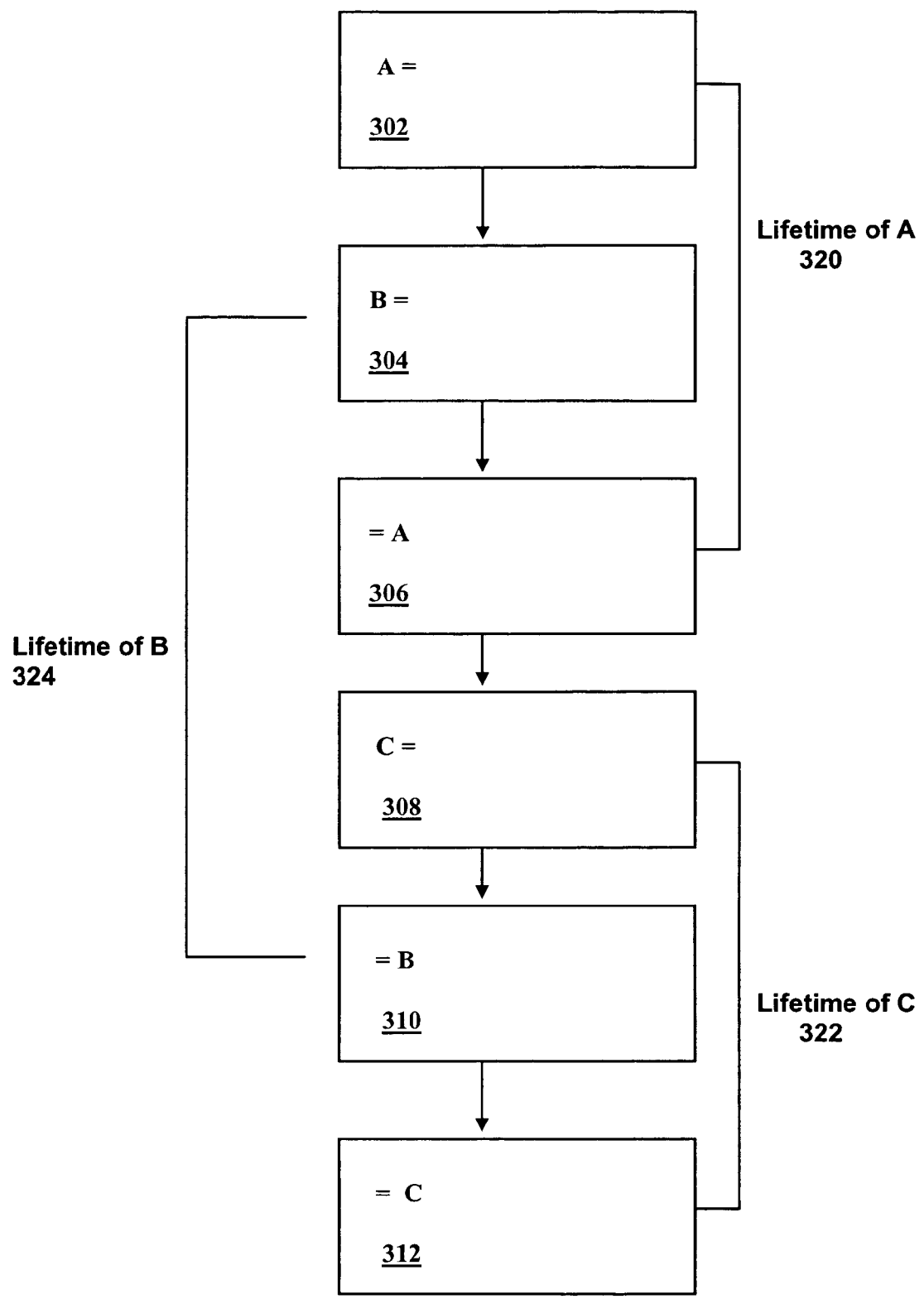
FIG. 9a is a flowgraph illustrating one aspect of the present invention, in which the traditional SSA construction technique is modified to accommodate simultaneous register allocation.

FIG. 9a is a flowgraph illustrating one aspect of the present invention, in which the traditional SSA construction technique is modified to accommodate register allocation. In block 302 variable A is defined (i.e., A=). In block 304, variable B is defined (i.e., B=). In block 306 variable A is used (i.e., =A). In block 308 variable C is defined (i.e., C=). In block 310 variable B is used (i.e., =B) and in block 312 variable C is used (i.e., =C). Hence, it can be seen that after block 306, variable A is never referenced again, so that the lifetime of A 320 extends from block 302 to block 306. The lifetime of variable C 322 similarly extends from block 308 to 312 and the lifetime of variable B 324 extends from block 304 to 310. Three variables A, B, and C are defined so three renaming stacks a 350, b 352, and c 354 depicted in FIG. 9b will be associated with the variables A 356, B 362 and C 372.

Figure 10:
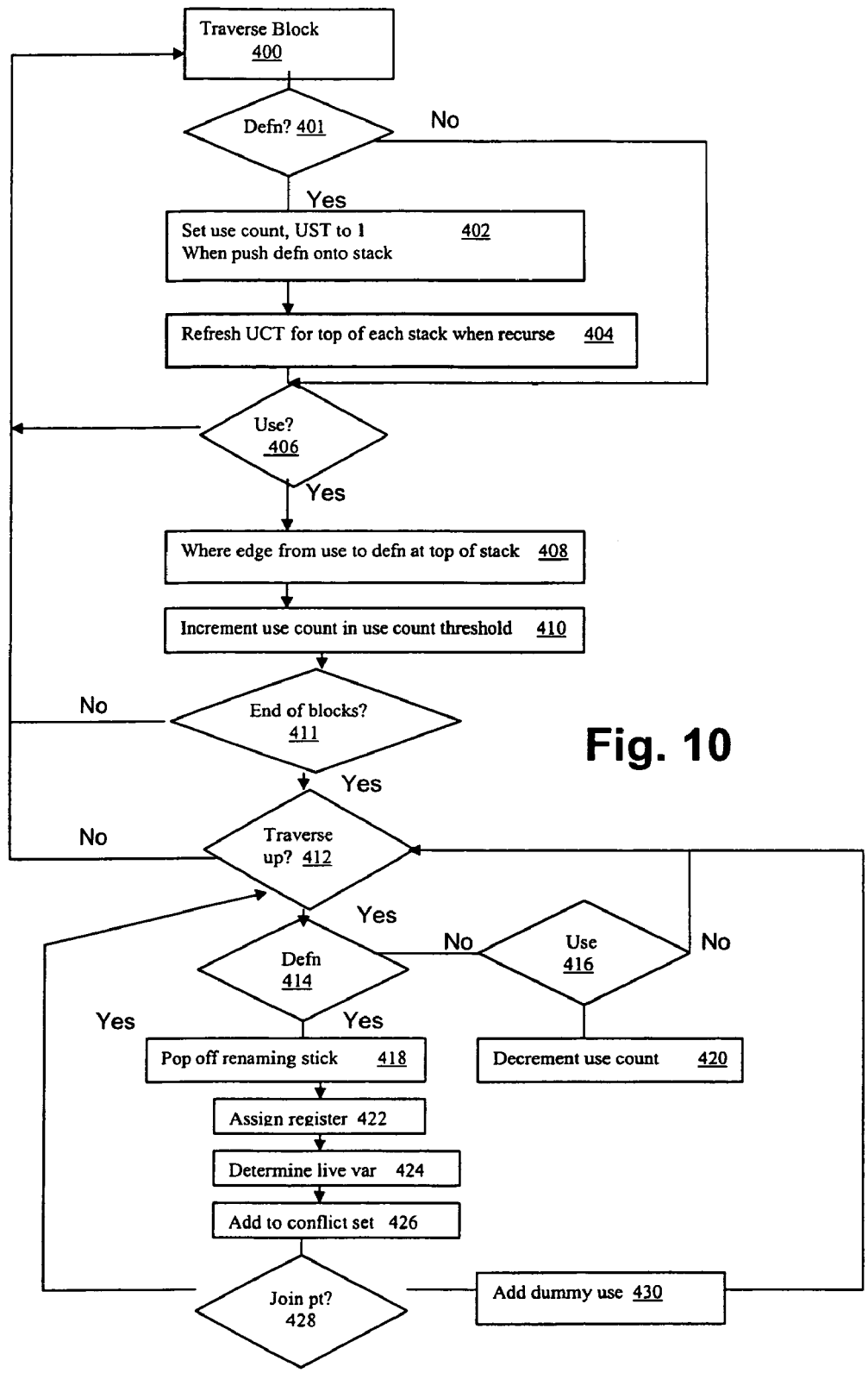
FIG. 10 is a flow diagram of an exemplary method for register allocation using SSA construction in accordance with one embodiment of the invention.

FIG. 10 is a flow diagram of a method for a modified SSA construction technique in which registers are simultaneously allocated in accordance with one embodiment of the invention. At step 400 a block is traversed. At step 401, the block is parsed for the presence of a definition for a symbol. If a definition is found, processing continues at step 402. If no definition is found, processing continues at step 406.

At step 402, the definition is pushed onto a stack associated with the symbol. Two counters, referred to herein as use count and use count threshold are initialized to a specified value (e.g., 1). At step 404, upon recursion the use count threshold is refreshed (described below). At step 406, the block is parsed for the presence of a use of the symbol in the block. If a use is found, processing continues at step 408. If no use is found, processing returns to step 400.

At step 408, an edge is wired from the use to the definition at the top of the stack associated with the symbol. At step 410, use count and use count threshold are incremented by a specified value (i.e., 1). At step 411, if there are no more blocks to traverse, processing continues at step 412. If there are more blocks to traverse, processing continues at step 400. At block 412, traversal proceeds upwards. The last block traversed is parsed at step 414. If a definition is found, processing continues at step 418. If no definition is found, the block is parsed for a use at step 416.

At step 418, the definition at the top of the renaming stack associated with the symbol is popped and the symbol may be assigned a register at step 422.

If a use is found at step 416, processing continues at step 420. If no use is found, processing continues at step 412. At step 420 the use count is decremented by a specified value (e.g., 1) and processing continues at step 412.

At step 422, the symbol may be assigned a register. The conflict set of the symbol to be assigned a register may be examined to determine a suitable register assignment. At step 424 the remaining live symbols may be determined. The symbol just assigned a register is added to the conflict set of the remaining live symbols at step 426. At step 428, it is determined if a join point has been encountered. If a join point has been encountered, processing continues at step 430. If a join point has not been encountered, processing continues at step 412. At step 430, dummy uses are added as described below and processing continues at step 412.

Figure 9B:
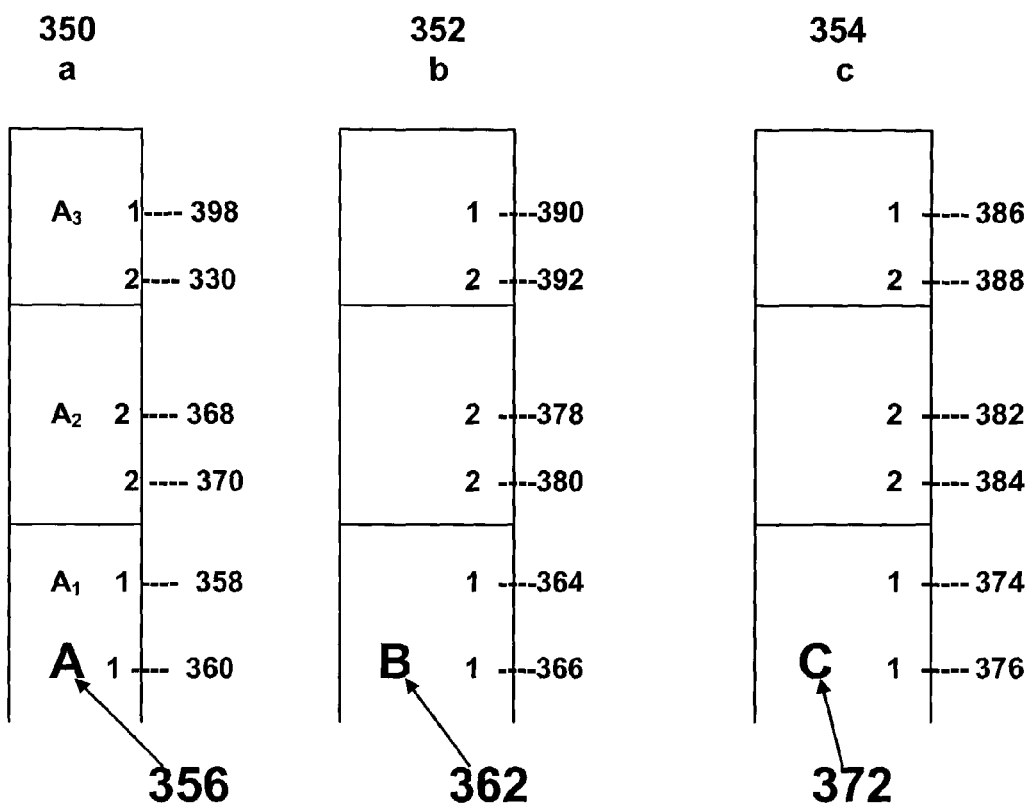
FIG. 9b is a block diagram illustrating three exemplary renaming stacks in accordance with one aspect of the present invention.

Because in the example straight line code is depicted, no dominance frontiers exist in the flowgraph of FIG. 9a. There is only one route to each block. Referring now concurrently to FIGS. 9a, 9b, and 10, at step 400 a block (block 302) is traversed. As block 302 is traversed, a variable definition (A=) is found (step 401) and pushed onto renaming stack a 356 (step 402). Use count 358 and use count threshold 360 are initialized to 1 (step 402). Because there are no uses in block 302 (step 406), processing returns to step 400 and a new block (block 304) is traversed.

As block 304 is traversed, a variable definition (B=) is found (step 401) and pushed onto renaming stack b 362 (step 402). Use count 364 and use count threshold 366 are initialized to 1 (step 402). Because there are no uses in block 304, processing returns to step 400 and a new block (block 306) is traversed.

As block 306 is traversed. In block 306, no definitions are found at step 401 so processing continues at step 406. At step 406 a use of A is found. Because a use is found the use of A is wired up to the definition of A 356 that is at the top of the renaming stack a 350 (step 408). Use count 358 is incremented to 2 368 and use count threshold 360 is incremented to 2 370 (step 410). Processing returns to step 400 and a new block (block 308) is traversed.

As block 308 is traversed, a variable definition (C=) is found (step 401) and pushed onto renaming stack c 354 (step 402). Use count 374 and use count threshold 376 are initialized to 1 (step 402). No use is found (step 406) so processing returns to step 400 and a new block (block 310) is traversed.

As block 310 is traversed, no definitions are found at step 401 so processing continues at step 406. At step 406 a use of B is found. Because a use is found the use of B is wired up to the definition of B 362 that is at the top of the renaming stack b 352 (step 408). Use count 364 is incremented to 2 378 and use count threshold 366 is incremented to 2 380 (step 410). Processing returns to step 400 and a new block (block 312) is traversed.

As block 312 is traversed, no definitions are found at step 401 so processing continues at step 406. At step 406 a use of C is found. Because a use is found the use of C is wired up to the definition of C 372 that is at the top of the renaming stack c 354 (step 408). Use count 374 is incremented to 2 382 and use count threshold 376 is incremented to 2 384 (step 410).

Thus after descending all the way down the flowgraph to block 312, the following state exists:

|  | A | B | C |
|---|---|---|---|
| Use count | 2 | 2 | 2 |
| Use count threshold | 2 | 2 | 2 |
| Live? | no | no | no |
| Explicit conflict set | — | — | — |

Because there are no more blocks (step 411) processing continues at step 412 and traversal proceeds upward (popping). The block just processed, block 312, is popped. At step 414, it is determined that there are no definitions in block 312, so processing continues at step 416. At step 416 it is determined that a use exists (=C). At step 420, use count 382 is decremented from 2 to 1 386. Use count threshold 384 is unchanged (388) and processing continues at step 412 and block 310 is traversed.

Thus after popping block 312, the following state exists:

|  | A | B | C |
|---|---|---|---|
| Use count | 2 | 2 | 1 |
| Use count threshold | 2 | 2 | 2 |
| Live? | no | no | yes |
| Explicit conflict set | — | — | — |

The block 310 is popped. At step 414, it is determined that there are no definitions in block 310, so processing continues at step 416. At step 416 it is determined that a use exists (=B). At step 420, use count 378 is decremented from 2 to 1 390. Use count threshold 380 is unchanged (392). Processing continues at step 412 and block 308 is traversed.

Thus after popping block 310 the following states exist:

|  | A | B | C |
|---|---|---|---|
| Use count | 2 | 1 | 1 |
| Use count threshold | 2 | 2 | 2 |
| Live? | no | yes | yes |
| Explicit conflict set | — | — | — |

The block 308 is popped. At step 414, it is determined that there is a definition (C=) in block 308, so processing continues at step 418. The definition is popped from the renaming stack c 354. The conflict set of variable C 399 is empty. The definition (C=) is removed from stack c 354 and is assigned a register (r1 394) at step 422. At step 424 the top of the remaining renaming stacks, stacks a 350 and b 352 are examined. Variable A 356 is live if and only if use count 368 is less than use count threshold 370 and use count 368 is greater than zero. In this case use count 368 and use count threshold 370 are both 2 so variable A is not live. Variable B is live if and only if use count 390 is less than use count threshold 392 and use count 390 is greater than zero. In this case use count 390 is 1 and use count threshold 392 is 2 so variable B is live. Because variable B is live, it conflicts with the variable C so that variable B and variable C can never share the same register. (B does not have a register associated with it yet, therefore B is not present in variable C's conflict set 399 therefore any register was available for allocation to variable C.) At step 426 variable C is added to the conflict set of all live variables (variable B's conflict set 396).

Thus after popping block 308 the following states exist:

|  | A | B | C |
|---|---|---|---|
| Use count | 2 | 1 | 0 |
| Use count threshold | 2 | 2 | 2 |
| Live? | no | yes | no |
| Explicit conflict set | — | C | — |
| Allocated register |  |  | r1 |

Processing continues at step 412. At step 412 block 306 is popped. Block 306 does not contain any definitions (step 414) but it does contain a use of variable A (step 416) so use count 368 is decremented by 1 (use count 398). Use count threshold 370 is unchanged (use count threshold 330).

Thus after popping block 306 the following states exist:

|  | A | B | C |
|---|---|---|---|
| Use count | 1 | 1 | 0 |
| Use count threshold | 2 | 2 | 2 |
| Live? | yes | yes | no |
| Explicit conflict set | — | C | — |
| Allocated register |  |  | r1 |

Processing continues at step 412. At step 412 block 304 is popped. Block 304 does not contain any uses (step 416) but does contain a definition (B=). At step 422 a register may be allocated to variable B, but because variable C is in variable B's conflict set 396, register 1 394 will not be chosen. Instead another register, such as perhaps register 2 332, may be assigned to B. At step 424 the top of the remaining renaming stacks, stack a 350 is examined. Variable A is live if and only if use count 398 is less than use count threshold 330 and use count 398 is greater than zero. In this case use count 398 is 1 and use count threshold 330 are 2 so variable A is live but no register has been allocated to it. At step 426 variable B is added to the conflict set of all live symbols (i.e., variable A's conflict set 334).

Thus after popping block 304 the following states exist:

|  | A | B | C |
|---|---|---|---|
| Use count | 1 | 0 | 0 |
| Use count threshold | 2 | 2 | 2 |
| Live? | yes | no | no |
| Explicit conflict set | B | C | — |
| Allocated register |  | r2 | r1 |

Processing continues at step 412. At step 412 block 302 is popped. Block 302 does not contain any uses (step 416) but does contain a definition (A=). At step 422 a register may be allocated to variable A, but because variable B is in variable A's conflict set 334, register 2 332 will not be chosen. Instead perhaps register 1 397 may be assigned to variable A. There are no remaining renaming stacks. At step 426, A is added to all currently live symbols but there are none.

Thus after popping block 302 the following states exist:

|  | A | B | C |
|---|---|---|---|
| Use count | 0 | 0 | 0 |
| Use count threshold | 2 | 2 | 2 |
| Live? | no | no | no |
| Explicit conflict set | B | C | — |
| Allocated register | r1 | r2 | r1 |

Figure 11A:
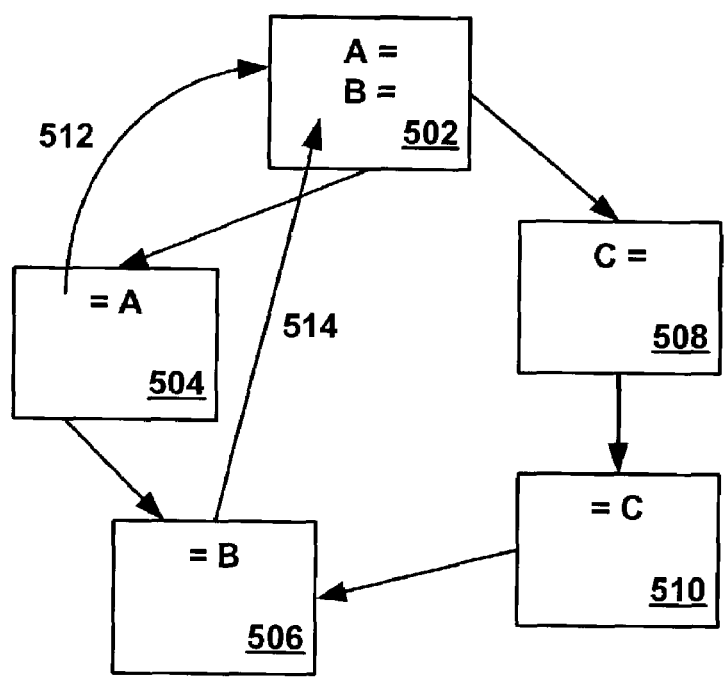
FIG. 11a is a flowgraph illustrating an aspect of the present invention.

FIG. 11*a* is a flowgraph illustrating one aspect of the present invention, in which the traditional SSA construction technique is modified to accommodate register allocation. Three variables A, B, and C are defined so three renaming stacks a 550, b 552, and c 554 depicted in FIG. 9*b* will be associated with the variables A, B and C.

As described above, when traversing block 502, definitions of variable A (A=) and B (B=) are found and pushed onto renaming stacks a 550 and b 552, use count 556 and 560 are initialized to 1, use count threshold 558 and 562 are initialized to 1. Thus, after traversing block 502, the following states exist:

|  | A | B | C |
|---|---|---|---|
| Use count | 1 | 1 | 0 |
| Use count threshold | 1 | 1 | 0 |
| Live? | no | no | no |
| Explicit conflict set | — | — | — |
| Allocated register |  |  |  |

When traversing block 504, a use of A is encountered, so use count 556 is incremented by 1 (use count 564) and use count threshold 558 is incremented by 1 (use count threshold 566) and edge 512 is drawn. After traversing block 504, the following states exist:

|   | A | B | C |
|---|---|---|---|
| Use count | 2 | 1 | 0 |
| Use count threshold | 2 | 1 | 0 |
| Live? | no | no | no |
| Explicit conflict set | — | — | — |
| Allocated register |   |   |   |

When traversing block 506, a use of B is encountered. Use count 560 is incremented by 1 (use count 568) and use count threshold 562 is incremented by 1 (use count threshold 570) and edge 514 is added. After traversing block 506, the following states exist:

|   | A | B | C |
|---|---|---|---|
| Use count | 2 | 2 | 0 |
| Use count threshold | 2 | 2 | 0 |
| Live? | no | no | no |
| Explicit conflict set | — | — | — |
| Allocated register |   |   |   |

Figure 11B:
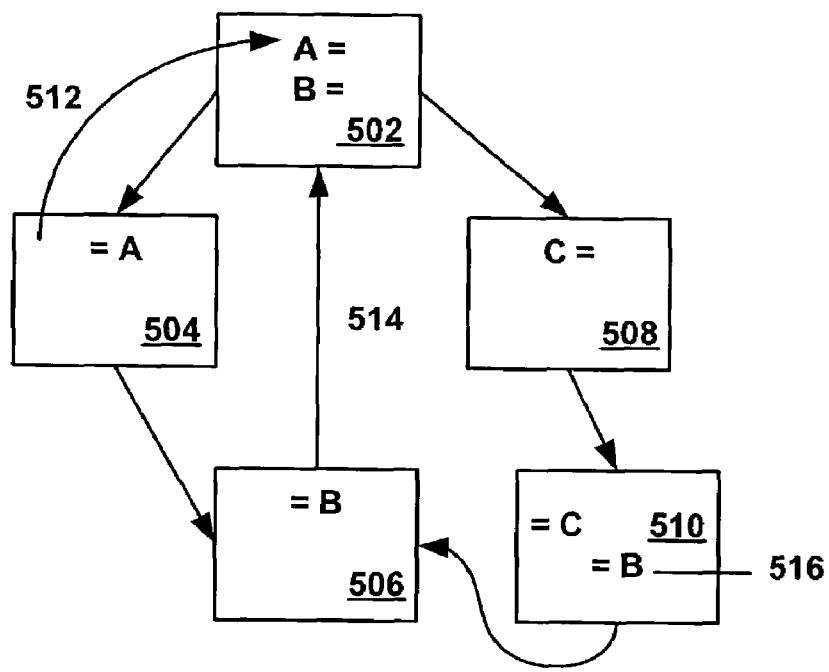
FIG. 11b illustrates the flowgraph of FIG. 11a after block 506 is popped, in accordance with one aspect of the present invention.
Figure 11C:
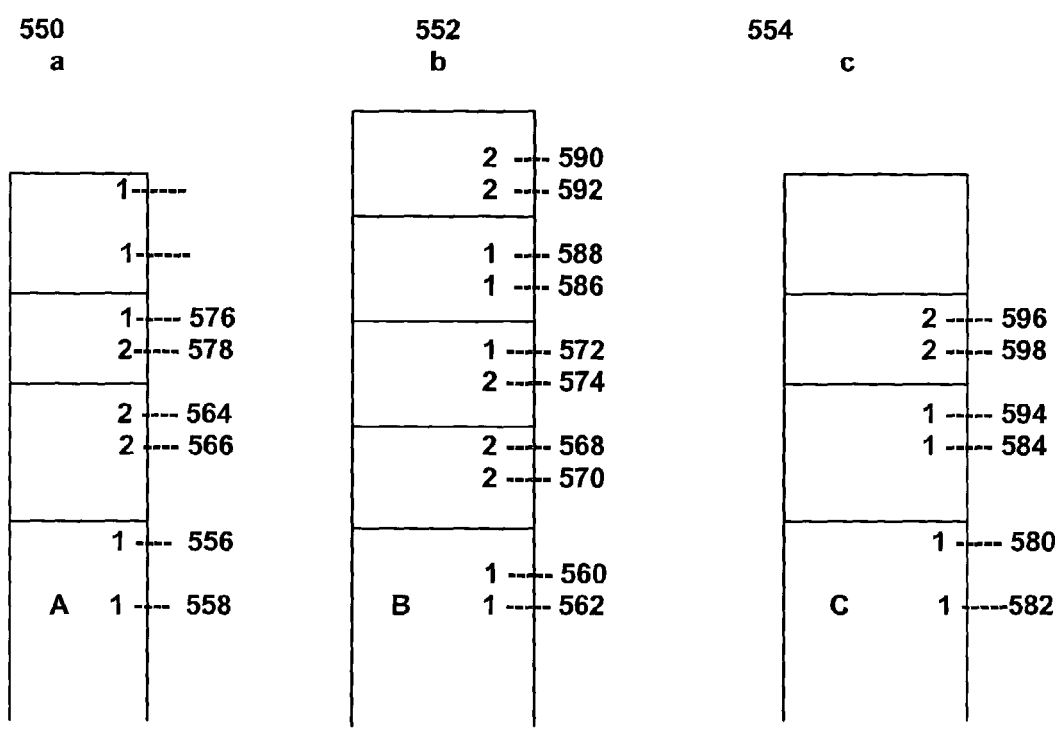
FIG. 11c illustrates three exemplary stacks in accordance with one aspect of the present invention.

When block 506 is popped. Use count 568 is decremented from 2 to 1 (use count 572) but use count threshold 570 is unchanged (use count threshold 574). Because block 506 is a join point (both blocks 504 and 510 lead to block 506), at step 430 a dummy use of any existing live variables (in this case only variable B is live) in any blocks which are predecessors of block 506 that have not yet been visited. At least one of block 506's predecessors (i.e., block 510), has not been visited. Consequently, a dummy use is inserted for all live variables (variable B) in block 510. FIG. 11b illustrates the flowgraph after block 506 is popped. In this case, an "=B" 516 is inserted in block 510. After popping block 506 the following states exist:

|   | A | B | C |
|---|---|---|---|
| Use count | 2 | 1 | 0 |
| Use count threshold | 2 | 2 | 0 |
| Live? | no | yes | no |
| Explicit conflict set | — | — | — |
| Allocated register |   |   |   |

When block 504 is popped, there are no definitions in the block, but there is a use of variable A. Use count 564 is decremented from 2 to 1 (use count 576). After popping block 504, the following states exist:

|   | A | B | C |
|---|---|---|---|
| Use count | 1 | 1 | 0 |
| Use count threshold | 2 | 2 | 0 |
| Live? | no | yes | no |
| Explicit conflict set | — | — | — |
| Allocated register |   |   |   |

Next block 508 is traversed. Block 508 contains a definition of C so use count 580 and use count threshold 582 are initialized to 1. Because the traversal is a descent, use count thresholds are refreshed with their respective current use counts (step 404). Use count threshold 584 is set to use count 580 and use count threshold 586 is set to use count 572. Therefore after updating the use count thresholds, the following states exist:

|   | A | B | C |
|---|---|---|---|
| Use count | 1 | 1 | 1 |
| Use count threshold | 1 | 1 | 1 |
| Live? | no | no | no |
| Explicit conflict set | — | — | — |
| Allocated register |   |   |   |

Next block 510 is traversed. Block 510 contains a usage of C and the dummy usage of B 516 that was added (FIG. 11b). Use counts 588 and 594 are incremented by 1 to yield use counts 590 and 597. Use count thresholds 586 and 584 are incremented by 1 to yield use counts 592 and 598. Therefore, after the use count and use count threshold updates, the following states exist:

|   | A | B | C |
|---|---|---|---|
| Use count | 1 | 2 | 2 |
| Use count threshold | 1 | 2 | 2 |
| Live? | no | yes | no |
| Explicit conflict set | — | — | — |
| Allocated register |   |   |   |

Next block 510 is popped, decrementing the use count for both B and C. After decrementing the use counts, the following states exist:

|   | A | B | C |
|---|---|---|---|
| Use count | 1 | 1 | 1 |
| Use count threshold | 1 | 2 | 2 |
| Live? | no | yes | yes |
| Explicit conflict set | — | — | — |
| Allocated register |   |   |   |

Next, block 508 is popped. Because block 508 contains a definition (definition of variable C), a register is assigned to C. Variable B is live so C is added to the conflict set of B. After block 508 is popped, the following states exist:

|   | A | B | C |
|---|---|---|---|
| Use count | 1 | 1 | 0 |
| Use count threshold | 1 | 2 | 2 |
| Live? | no | yes | no |
| Explicit conflict set | — | C | — |
| Register allocated |   |   | r1 |

Finally block 502 is popped. Block 502 contains definitions for A and B. When a register is assigned to A, B is live but does not yet have a register associated with it. Since the explicit conflict set of A is empty, A can be assigned register r1 and A is added to the explicit conflict set of B. A register is assigned to B. Registers used by the members of B's explicit conflict set (A and C) are not available for allocation to B, but register r2 may be assigned to B. After processing the following states exist:

|                      | A   | B    | C   |
|----------------------|-----|------|-----|
| Use count            | 0   | 0    | 0   |
| Use count threshold  | 1   | 2    | 2   |
| Live?                | no  | no   | no  |
| Explicit conflict set| —   | A, C | —   |
| Allocated register   | r1  | r2   | r1  |

Figure 12:
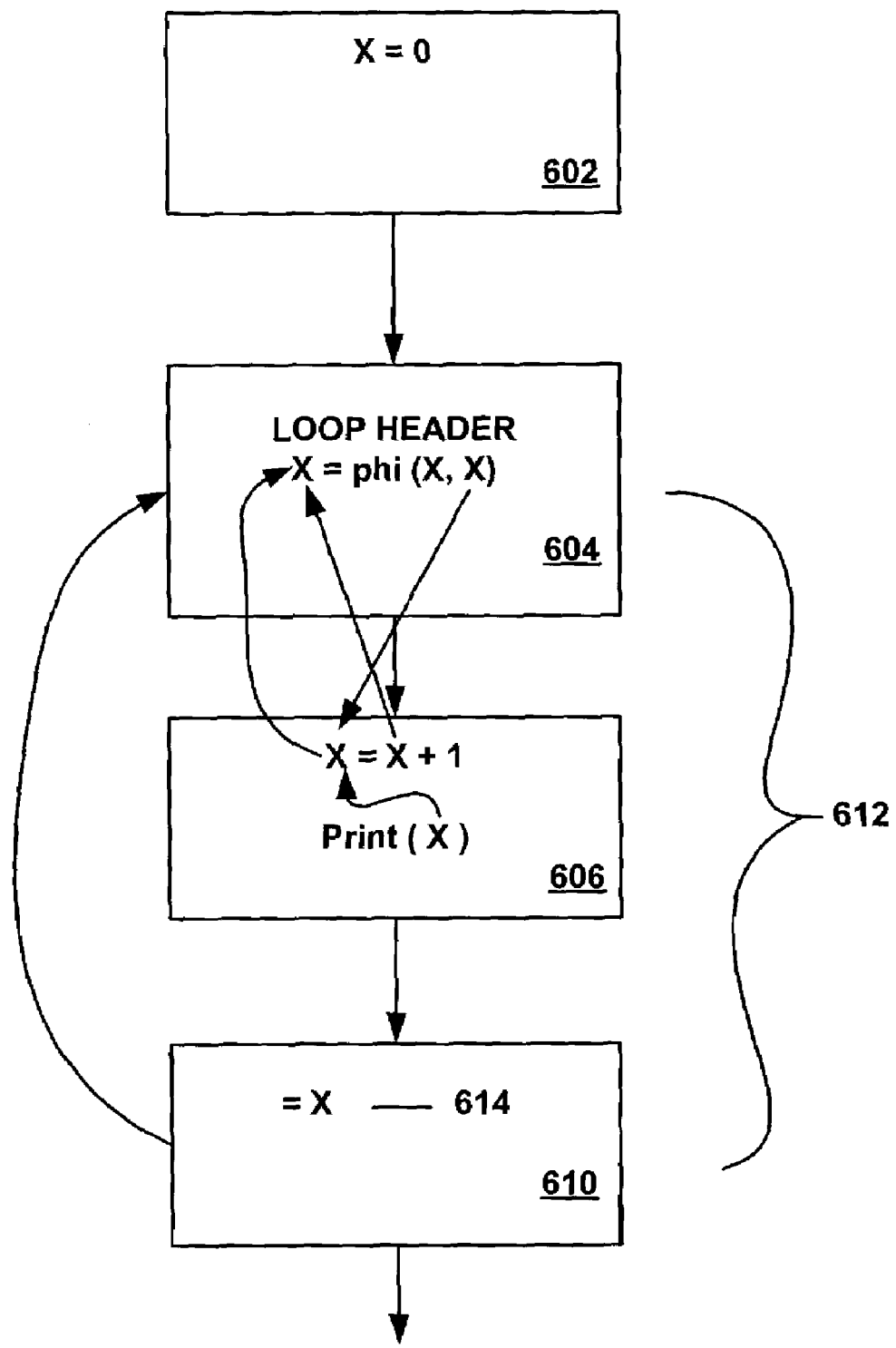
FIG. 12 illustrates the use of a variable in a loop in accordance with the present invention.

FIG. 12 is a flowgraph illustrating a further aspect of the invention. When a variable is live through a loop, special processing must be performed to ensure that the register allocated to the variable is kept live for the duration of the body of loop, not just until the final use of the variable within the loop. For example, in the flowgraph of FIG. 12, variable x is initialized to a specified value (i.e., 0) in block 602 and then incremented and printed in block 606 (the final use of variable x within the loop) within the body of a loop, 612. In this case, variable x is "live across the back edge of the loop". In accordance with the traditional SSA technique, it is known that if a variable is live across the back edge of a loop, then there must be a phi-node for the symbol in the header block of the loop (block 604) and that phi function must be involved in a cycle of use-def edges (the cycle in this case being blocks 604 and 606). Hence, if a variable (e.g., variable x) is live across the back edge of a loop (e.g., loop 612), the lifetime of variable x is extended by adding a dummy use 614 at the end of the loop body.

It is noted that the foregoing examples have been provided merely for the purpose of explanation and are in no way to be construed as limiting of the present invention.

What is claimed is:

1. A method for register allocation comprising:
generating a conflict set associated with a first symbol during Static Single Assignment form construction of a program;
allocating a register to the first symbol using the conflict set such that the register allocated to the first symbol is not used by a member of the first symbol's conflict set;
incrementing a first counter and a second counter when a use of a second symbol is detected when traversing a block in a depth-first downward traversal;
decrementing the first counter when a use of said second symbol is detected when traversing the block in an upward traversal; and
determining that the second symbol is live by ascertaining that the first counter is less than the second counter and the first counter is greater than zero when the allocating step is performed.

2. The method of claim 1, wherein generating the first symbol's conflict set comprises:
responsive to determining that the symbol is live, adding a register-allocated symbol to the symbol's conflict set.

3. The method of claim 2, wherein the conflict set is generated during a renaming phase of the Static Single Assignment form construction.

4. The method of claim 1, further comprising adding the register-allocated symbol to a conflict set associated with the second symbol.

5. The method of claim 1, further comprising adding a dummy use for the second symbol in each unvisited predecessor block of the traversed block.

6. The method of claim 1, wherein a dummy use is added to the last block in a loop.

7. A system for register allocation comprising:
a memory for storing information generated by a compiler; and
the compiler that allocates registers as a Static Simple Allocation form is generated for a program;
wherein the compiler generates a renaming stack, a first counter and a second counter associated with a symbol, wherein the first counter and the second counter are incremented when a use of the symbol is detected during a depth-first traversal of the program and the first counter is decremented when a use of the symbol is detected during an upward traversal of the program.

8. The system of claim 7, wherein the compiler allocates a register for the symbol when a definition of the symbol is detected during an upward traversal of the program.

9. The system of claim 8, wherein a conflict set for the symbol is examined when the register is allocated for the symbol to determine an allowable register for allocation to the symbol.

10. The system of claim 9, wherein the conflict set comprises at least one member symbol that conflicts with the symbol to be allocated, such that the symbol to be allocated may not be allocated to a register to which the member symbol has been allocated.

11. The system of claim 10, wherein the allocated symbol is added to a conflict set associated with a live symbol.

* * * * *